Patent text page

3,126,376
FLUORINATED ANDROSTENES AND INTERMEDIATES RELATING THERETO
Cecil H. Robinson, Cedar Grove, N.J., assignor to Schering Corporation, Bloomfield, N.J., a corporation of New Jersey
No Drawing. Filed Feb. 5, 1962, Ser. No. 171,274
5 Claims. (Cl. 260—239.55)

This invention relates to a new group of therapeutically valuable compounds and to methods for their manufacture, including intermediates valuable in the synthesis thereof. More particularly, my invention relates to 16,16-difluoro-4-androstenes as well as the 19-nor and 1-dehydro analogs thereof. Also embraced within my invention are $9\beta,11\beta$-oxido-16,16-difluoro-4-androstenes, 16,16-difluoro-4,9(11)-androstadienes, and 16,16-difluoro-5-androstenes, all valuable intermediates in the preparation of the aforementioned class of compounds.

By means of my novel process I can difluorinate the 16-position of a compound of the androstane and estrane series. By androstane I mean nuclear saturated compounds such as androstane-3,17-dione, $5\beta$-androstane-3,17-dione, epiandrosterone (androstane-$3\beta$-ol-17-one) and $5\beta$-epiandrosterone; and nuclear unsaturated compounds such as androstenolone (5-androstene-$3\beta$-ol-17-one), testosterone (4-androstene-$17\beta$-ol-3-one), 19-nortestosterone, 4-androstene-3,17-dione, 1,4-androstadiene-3,17-dione, and 1,4,6-androstatriene - 3,17 - dione. The term estrane includes compounds such as estrone (1,3,5(10) - estratriene - $3\beta$-ol-17 - one), di - isoequilenin (1,3,5(10),6,8-estrapentaene-$3\beta$ - ol - 17 - one) and 5,7,9-estratriene-$3\beta$-ol-17-one. Also encompassed within the term androstane and estrane are derivatives such as the 11-oxygenated, the 17-alkyl and 17-alkynyl substituted androstanes and estranes, and esters thereof.

I have found in the androstane series that 4-androstenes having the structural formula shown below, as well as the 19-nor and 1-dehydro analogs thereof, are particularly valuable therapeutic agents, the $17\alpha$-alkynyl substituted-4-androstenes being progestational agents and the other 4-androstenes of the general formula possessing androgenic activity.

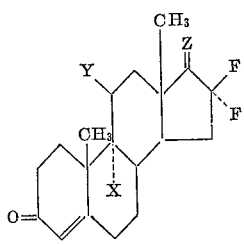

wherein X is a member of the group consisting of hydrogen and halogen; Y is a member of the group consisting of hydrogen, halogen, hydroxyl and ketone, and when Y is hydrogen, X is hydrogen; and Z is a member of the group consisting of O, (H,$\beta$OR), ($\alpha$-lower alkynyl,$\beta$OR), ($\alpha$-lower alkyl,$\beta$OR) wherein R is a member of the group consisting of hydrogen and an acyl radical of a hydrocarbon carboxylic acid containing up to eight carbon atoms.

By the term lower alkyl is contemplated hydrocarbon radicals having preferably up to four carbon atoms and including radicals such as methyl, ethyl, isopropyl, n-propyl, n-butyl and the like.

The term lower alkynyl embraces hydrocarbon radicals having preferably up to four carbon atoms and having a triple bond stemming from the carbon adjacent to the steroid nucleus. Included are radicals such as ethylnyl, 1'-propynyl, and 1'-butynyl.

The acyl radicals at C–17 included in my invention are radicals preferably from lower alkanoic acids such as acetic, propionic, butyric, valeric, caproic and the like.

My invention therefore relates to compounds such as 16,16-difluoro-4-androstene - 3,17 - dione, 16,16-difluoro-testosterone (16,16 - difluoro-4-androstene-$17\beta$-ol-3-one), 16,16-difluoro-$17\alpha$-ethinyltestosterone and 16,16-difluoro-$17\alpha$-methyltestosterone, the 11-oxygenated, $9\alpha$-halogeno-11-oxygenated and the $9\alpha,11\beta$-dihalogeno derivatives of the foregoing as well as their 19-nor and 1-dehydro analogs.

The novel 16,16-difluoroandrostenes of the general formula are physiologically active substances, the 16,16-difluoro-$17\alpha$-lower alkynylandrostenes being progestational agents, and the other 16,16-difluoroandrostenes of the general formula possessing androgenic activity. My novel 16,16-difluoro-$17\alpha$-lower alkynylandrostenes are therefore useful in treating ailments such as habitual and threatened abortion, female hypogonadism, primary and secondary amenorrhea and premature labor; whereas the novel 17-keto-, $17\beta$-hydroxy-, and $17\alpha$-methyl-$17\beta$-hydroxy-16,16-difluoroandrostenes are used to alleviate disorders such as male hypogonadism and male climateric and, in the female, for ailments such as dysmenorrhea, premenstrual tension and suppression of lactation. The compounds of this invention are formulated for administration in preparations similar to those used in other known androgenic agents such as testosterone or, in the case of 16,16-difluoro-$17\alpha$-lower alkynylandrostenes, in preparations similar to those used in other known progestational agents such as progesterone, the concentration and/or dosage used being based on the activity of the particular compound.

The preferred group of my therapeutically valuable compounds are those androstenes of the general formula which possess a halogen at C–9 and an oxygen function at C–11 and, in particular, the $9\alpha$-fluoro-$11\beta$-hydroxy-16,16-difluoro-androstenes. This group thus includes $9\alpha$-halogeno-$11\beta$-hydroxy-16,16-difluoro-4-androstenes, $9\alpha$-halogeno - $11\beta$-hydroxy-16,16-difluoro-1,4-androstadienes and $9\alpha$-halogeno - $11\beta$ - hydroxy-16,16-difluoro-19-nor-4-androstenes. Of the aforementioned trihalogenated-11-oxygenated androstenes, the more therapeutically valuable are those which also possess a hydroxyl group at C–17, particularly the 16,16-difluoro-$17\alpha$-alkyl-$17\beta$-hydroxy-4-androstenes.

The novel 16,16-difluoro compounds of my invention are preferably obtained by reacting an intermediary 16-hydroxy-methylene (existing in two tautomeric forms—the other being 16-formyl)-androstene or a 16-(1'-hydroxy-1'-carbethoxy)methylene-(tautomeric to 16-ethoxalyl)-androstene with perchloryl fluoride in the presence of alkoxide, preferably potassium t-butoxide, in t-butanol solvent. Surprisingly, the hydroxymethylene or (1'-hydroxy-1'-carbethoxy)methylene (i.e., ethoxalyl) group at C–16 is eliminated and there is attached thereto two fluorine atoms, one in the $\alpha$-position and the other in the $\beta$-position. Specifically, 16-hydroxymethylene-5-androstene-$3\beta$-ol-17-one when reacted with perchloryl fluoride in the presence of potassium t-butoxide according to our novel process yields 16,16-difluoro-5-androstene-$3\beta$-ol-17-one, which when oxidized with aluminum isopropoxide, for example, yields a novel 4-androstene of my invention, 16,16-difluoro-4-androstene-3,17-dione.

The 16,16-difluoroandrostanes and 16,16-difluoroestranes prepared according to my novel process are preferably obtained from a precursor containing no other substituents in the D-ring except a 17-keto function. Thus, typical of the starting materials useful in the preparation of the final products of my invention are compounds such as 4-androstene-3,17-dione, 5-androstene-$3\beta$-ol-17-one, $9\alpha$-fluoro-$11\beta$-hydroxy 4-androstene-3,17-dione, $9\beta,11\beta$-oxido - 4 - androstene-3,17-dione, 4,9(11)-androstadiene-3,17-dione, 9α,11β-dichloro-4-androstene-3,17-dione and the 19-nor analogs of the foregoing. The 17-keto starting compounds are converted to 16-hydroxymethylene or 16-ethoxalyl [i.e., 16-(1'-hydroxy-1'-carbethoxy)methylene] intermediary derivatives by methods well known in the art. I prefer to formylate the activated C-16 position by reacting the 17-keto steroid with ethyl formate and sodium methoxide or sodium hydride in benzene or tetrahydrofuran as solvent or mixtures thereof. The 16-formyl analog thereby obtained apparently exists in the two tautomeric forms, namely, formyl and hydroxymethylene. The 16-ethoxalyl intermediates are prepared according to procedures similar to those for preparing the 16-hydroxymethylene derivative by using as reagent ethyl oxalate instead of ethyl formate. The 16-ethoxylyl derivative thereby obtained also exists in two tautomeric forms (keto and enol), namely, 16-ethoxalyl-(keto) and 16-(1'-hydroxy-1'-carbethoxy)methylene (enol).

During the formation of the 16-hydroxymethylene or 16-ethoxalyl function it is necessary that any reactive keto groups present elsewhere in the molecule, such as exists in 4,9(11)-androstadiene-3,17-dione, must first be protected by the usual protective moieties such as ketals, enol-ethers, and enamines. The 3-keto group may then be regenerated by acid hydrolysis. Analogously, it is necessary that there not be groups elsewhere in the molecule which are sensitive to or react with base, as would occur during the reaction with perchloryl fluoride. Thus, if it is desired that the final products possess a 9α-halogeno-11β-hydroxy group, it is preferable that the substituents in the D-ring be introduced into either a Δ$^{9,11}$-intermediate or a 9β,11β-epoxyandrostene which can be converted by known methods to the 9α-halogeno-11β-hydroxy analog. Similarly, my novel 9α,11β-dihalogen-16,16-difluoroandrostenes are preferably prepared from a 16-hydroxymethylene or 16-ethoxalyl-9(11)-dehydroandrostene intermediate. After reaction with perchloryl fluoride and base according to my novel process, the resultant 16,16-difluoro-9(11)-dehydroandrostene is halogenated at the 9 and 11-positions according to techniques similar to those described in U.S. Patent No. 2,894,963. For example, when the 3-ethylene ketal derivative of 4,9(11)-androstadiene-3,17-dione (3-ethylenedioxy-5,9(11)-androstadiene-17-one) is reacted with sodium methoxide and ethyl formate in benzene there is formed the intermediary 3-ethylenedioxy-16-hydroxymethylene-5,9(11)-androstadiene-17-one which upon reaction with perchloryl fluoride and potassium t-butoxide according to my process, followed by hydrolysis of the 3-ketal function with 90% aqueous acetic acid for example, yields the novel intermediate, 16,16-difluoro-4,9(11)-androstadiene-3,17-dione. Halogenation at C-9 and C-11 may be effected by reagents such as chlorine in carbon tetrachloride in the presence of pyridine to give 9α,11β-dichloro-16,16-difluoro-4-androstene-3,17-dione. When N-bromoacetamide and hydrogen fluoride in diethylacetic acid is reacted with the aforementioned 9(11)-dehydro intermediate there is obtained 9α-bromo-11β,16α,16β-trifluoro-4-androstene-3,17-dione. By the proper choice of reagents, halogen pairs that may be entered in the 9 and 11-positions in the C-ring include such as (Cl,Cl), (Br,Br), (F,F), (Cl,Br), (Cl,F), (F,Cl), (F,Br), (I,Cl), (I,F), (Br,F) and the like.

The 16,16-difluoro-17-keto compounds may be transformed to their 17α-lower alkynyl-17β-hydroxy or 17α-lower alkyl-17β-hydroxy analogs by known methods. For example, 16,16-difluoro-4-androstene-3,17-dione is readily transformed to 16,16-difluoro-17α-methyl-4-androstene-17β-ol-3-one by the well known Grignard type reaction or to the corresponding 17α-ethinyl derivative by means of sodium or potassium acetylide. The 17-keto compounds likewise are reduced to the 17β-hydroxy analogs by hydrogenation with lithium aluminum hydride. Quite naturally, other reactive keto groups must first be protected prior to the reduction.

By substituting suitable reagents in the aforementioned reactions such as ethyl magnesium bromide instead of methyl magnesium iodide in the Grignard reaction there are obtained higher homologs at C-17, for example, 16,16-difluoro-17α-ethyl-4-androstene-17β-ol-3-one. Higher homologs of the 16,16-difluoro-17α-ethinyl-17β-hydroxyandrostenes of my invention are preferably prepared from the corresponding 17α-ethinylandrostane via alkylation reactions utilizing, for example, lithium and methyl iodide to give compounds such as 16,16-difluoro-17α-(1'-propynyl)-4-androstene-17β-ol-3-one. By using ethyl iodide and lithium in the aforementioned reaction, there is obtained 16,16-difluoro-17α-(1'-butynyl)-4-androstene-17β-ol-3-one.

My process whereby a 16-formyl (16-hydroxymethylene) or 16-ethoxalyl [i.e., 16-(1'-hydroxy-1'-carbethoxy)methylene] derivative of a steroidal 17-ketone is reacted with perchloryl fluoride to give the corresponding 16,16-difluoro-17-keto steroid is carried out in the presence of a strong base (preferably potassium t-butoxide) in a polar solvent (preferably t-butanol) usually at temperatures in the range of 20–40° C. for a period of time ranging from 45 minutes to 3 hours. During this time, perchloryl fluoride is constantly bubbled through the reaction mixture thus insuring the presence of an excess of perchloryl fluoride to each mole of steroid used. When potassium t-butoxide in t-butanol is used, for example, the reaction is generally carried out at 25–35° C. for approximately 90 minutes. The lower limit of the reaction temperature is generally determined by the freezing point of the reaction mixture and thus indirectly by the freezing point of the solvent since the lower the freezing point of the solvent, the lower the freezing point of the mixture. With potassium t-amylate, for example, the reaction could be carried out at temperatures as low as 0° C. My novel process preferably utilizes at least 3 moles of base, e.g. potassium t-butoxide, to each mole of 16-hydroxymethylene-17-keto or 16-ethoxalyl-17-keto steroid present, although higher quantities of base may be used without substantially changing the course of the reaction.

I have described my process in detail using as starting compounds androstenes possessing an unsaturation at C-5. My process works equally well on estratrienes and androstanes. For example, estrone methyl ether (3-methoxy-1,3,5(10)-estratriene-17-one) and androsterone (3α-hydroxyandrostane-17-one) are each convertible by reaction with sodium methoxide and ethyl formate to the corresponding 16-hydroxymethylene intermediate, i.e., 16-hydroxymethylene estrone 3-methyl ether and 16-hydroxymethyleneandrosterone, respectively. Reaction of the 16-hydroxy methylene intermediates with perchloryl fluoride and potassium t-butoxide in t-butanol will yield respectively 16,16-difluoroestrone 3-methyl ether and 16,16-difluoroandrosterone. Both the 16,16-difluoroestrogens and 16,16-difluoroandrostanes as described in copending applications, Serial No. 7,124 now Pat. No. 3,048,605 and Serial No. 7,116, now Pat. No. 3,045,032 filed February 8, 1960 are useful in the treatment of arteriosclerosis.

Alternatively, 16,16-difluoroandrostanes may be prepared from 16,16-difluoroandrostenes of this invention by utilizing a series of known procedures. For example, 16,16-difluoro-5-androstene-3β-ol-17-one prepared according to my novel process from 16-hydroxymethylene-5-androstene-3β-ol-17-one and perchloryl fluoride, upon hydrogenation in ethylacetate utilizing platinum oxide as catalyst yields 16,16-difluoroepiandrosterone (16,16-difluoroandrostane-3β-ol-17-one). Conversion of the 3β-hydroxyl group to the 3-keto is effected by a chromic acid oxidation to give 16,16-difluoroandrostane-3,17-dione. Alternatively, esterification of the 3β-hydroxyl group with p-toluenesulfonic acid in pyridine, for example, gives 16,16-difluoroandrostane-3β-ol-17-one 3-tosylate. Displacement of the 3β-tosylate by sodium acetate using known techniques gives the corresponding 3α-acetoxy-16,16-difluoroandrostane-17-one which when hydrolyzed with ethanolic potassium hydroxide yields the therapeutically valuable 16,16-difluoroandrosterone (16,16-difluoroandrostane-3α-ol-17-one).

In like manner, utilizing similar techniques other 16,16-difluoro-5-androstenes of this invention such as 16,16-difluoro-17α-methyl-5-androstene - 3β,17β-diol are convertible to the corresponding 16,16-difluoroandrostanes as well as the 3α-hydroxy epimers and 3-keto analogs thereof. It is thus apparent that the 3β-hydroxy-16,16-difluoro-5-androstenes prepared by my process as described herein are valuable as intermediates in the preparation of pharmacologically active 16,16-difluoroandrostanes as well as in the preparation of the novel 16,16-difluoro-4-androstenes and 16,16-difluoro-1,4-androstadienes of this invention.

The 16,16-difluoro-1,4-androstadienes of the general formula are preferably prepared from the corresponding 16,16-difluoro-4-androstenes described hereinabove by microbiological dehydrogenation with an organism such as Corynebacterium simplex (A.T.C.C. 6946) in a manner similar to that described in U.S. Patent No. 2,837,464, or by chemical dehydrogenation through the use of reagents such as selenium dioxide. Thus, when 16,16-difluoro-4-androstene-3,17-dione, 16,16-difluoro-4-androstene-17β-ol-3-one, 16-16 - difluoro-17α-methyl-4-androstene-17β-ol-3-one and 16,16 - difluoro-17α-ethinyl-4-androstene-17β-ol-3-one are each subjected to the action of Corynebacterium simplex there is obtained the corresponding 1-dehydro analog, i.e. 16,16-difluoro-1,4-androstadiene-3,17-dione, 16-16-difluoro - 1,4 - androstadiene-17β-ol-3-one, 16,16 - difluoro-17α-methyl-1,4-androstadiene-17β - ol-3-one and 16,16-difluoro-17α-ethinyl-1,4-androstadiene-17β-ol-3-one, respectively.

My novel 16,16-difluoro-19-nor-4-androstenes may be obtained from 19-nortestosterone utilizing the process of this invention. The 3-ethylene ketal derivative of 19-nortestosterone, prepared from ethylene glycol by known techniques, is oxidized at C-17 with chromium trioxide in pyridine to give 3-ethylenedioxy-19-nor-5-androstene-17-one. When the aforementioned 17-keto-19-nor-5-androstene is reacted with ethyl formate and sodium methoxide there is formed the intermediary 3-ethylenedioxy-16-hydroxymethylene-19-nor-5-androstene-17 - one which upon reaction with perchloryl fluoride and potassium t-butoxide according to my process followed by hydrolysis of the 3-ketal function with 90% aqueous acetic acid yields the novel 16,16-difluoro-19-nor-4-androstene-3,17-dione.

Alternatively, the 19-nor analog of the 16,16-difluoro-4-androstenes of the general formula are conveniently prepared by utilizing as intermediates 16,16-difluoro-1,3,5 (10)-estratrienes. For example, 3-methoxy-16,16-difluoro-1,3,5(10)-estratriene-17β-ol, described in copending application Serial No. 7,124 filed February 8, 1960, upon reduction with lithium in ammonia according to known techniques yields 3-methoxy-16,16-difluoro-2,5(10)-estradiene-17β-ol which, upon subsequent treatment with a strong acid, such as hydrochloric is converted to 16,16-difluoro-19-nor-4-androstene-17β-ol-3-one of this invention. Conversion of the 17β-hydroxyl group to 17-keto is effected by chromic acid oxidation, yielding 16,16-difluoro-19-nor-4-androstene-3,17-dione.

The compound 16,16-difluoro-17-keto-19-nor-4-androstene-3-one (obtained by either of the above described procedures, when subjected to reactions similar to those described hereinabove for the 16,16-difluoro-17-keto-4-androstenes of this invention is convertible to the 17α-methyl-17β-hydroxy and the 17α-ethinyl-17β-hydroxy-16,16-difluoro-19-nor-4-androstene-3-ones.

The following examples are used for illustrative purposes only and are not to be construed as limiting the scope, the scope of our invention being defined by the appended claims.

The present application is a continuation-in-part of my copending application, Serial No. 7,107, filed February 8, 1960.

EXAMPLE 1

16,16-Difluoro-4-Androstene-3,17-Dione

A. *16,16-difluoro-5-androstene-3β-ol-17-one.*—To a solution of 5 g. of 16-hydroxymethylene-5-androstene-3β-ol-17-one in 1200 ml. of t-butanol is added 4.25 g. of potassium t-butoxide in 134 ml. of t-butanol. Perchloryl fluoride gas is bubbled through the solution at room temperature for 90 minutes. 500 ml. of water is then added and the mixture concentrated in vacuo to a volume of about 700 ml. A further 500 ml. of water is added and the mixture extracted with ether. The ethereal extracts are combined, washed with water, dried over sodium sulfate and evaporated in vacuo to a residue which is chromatographed on Florisil and eluted with hexane-ether (1:1). The hexane-ether eluates are combined and concentrated to a residue which is crystallized from acetone-hexane to give 16,16-difluoro-5-androstene-3β-ol-17-one, M.P. 151–154° C., $[\alpha]_D$+27° (dioxane).

B. *16,16-difluoro-4-androstene-3,17-dione.*—A solution of 400 mg. of 16,16-difluoro-5-androstene-3β-ol-17-one in 4 ml. of cyclohexanone and 11 ml. of toluene is distilled until 3 ml. of distillate have been collected. A solution of 400 mg. of aluminum isopropoxide in 4 ml. of toluene is added to the refluxing solution. The mixture is refluxed for one hour during which time 3 ml. of distillate are removed. Ice and water are then added and the mixture is steam distilled to remove the organic solvents. The resulting residual aqueous suspension is extracted with ethyl acetate. The extracts are combined, washed with water, dried over sodium sulfate and evaporated in vacuo to a residue which is recrystallized from acetone-hexane to give 16,16-difluoro-4-androstene-3,17-dione, M.P. 176–180° C., $[\alpha]_D$+185°, $\lambda_{max.}^{MeOH}$ 239 m$\mu$ (16,000), $\lambda_{max.}^{Nujol}$ 5.64; 6.00; 6.18$\mu$

EXAMPLE 2

16,16-Difluoro-17α-Ethinyl-4-Androstene-17β-Ol-3-One

A. *16,16 - difluoro - 17α - ethinyl-5-androstene-3β,17β-diol.*—Four milliliters of a 17% suspension of sodium acetylide in xylene is centrifuged, the supernatant liquid is decanted and 5 ml. of dimethylsulfoxide added. The sodium acetylide in dimethylsulfoxide is then added at room temperature to a solution of 500 mg. of 16,16-difluoro-5-androstene-3β-ol-17-one in 7 ml. of dimethylsulfoxide. The mixture is stirred at room temperature for 40 minutes, then ice and water are added. A precipitate forms which is filtered, washed with water, dried and crystallized from acetone-hexane to give 16,16-difluoro-17α-ethinyl-5-androstene-3β,17β-diol, M.P. 184–186° C. $[\alpha]_D$—94° (dioxane)

$\lambda_{max.}^{Nujol}$ 3.05, 4.73$\mu$

B. *16,16 - difluoro - 17α-ethinyl-4-androstene-17β-ol-3-one.*—400 mg. of 16,16 - difluoro - 17α - ethinyl-5-androstene-3β,17β-diol are dissolved in 500 ml. of cyclohexanone and 15 ml. of toluene. The mixture is distilled until 4 ml. of distillate have been collected. To the reaction mixture at reflux is added a solution of 400 mg. of aluminum isopropoxide in 4 ml. of toluene. The reaction mixture is refluxed for one hour during which time 5 ml. of distillate are removed. Ice and water are then added and the mixture is steam distilled to remove the organic solvents. The resultant residual aqueous suspension is then extracted with ethyl acetate. The extracts are combined, washed with water, dried over sodium sulfate and evaporated in vacuo to a residue which is chromatographed on Florisil. The hexane-ether (3:2)

eluates are combined and concentrated to a residue of 16,16 - difluoro - 17α - ethinyl-4-androstene-17β-ol-3-one, M.P. 209–211° C., [α]$_D$+40° (dioxane)

$\lambda_{max.}^{MeOH}$ 240 mμ (16,300), $\lambda_{max.}^{Nujol}$ 2.98; 3.08; 4.74; 6.05; 6.18μ

EXAMPLE 3

*16,16-Difluoro-17α-Methyl-4-Androstene-17β-Ol-3-One*

A. *16,16 - difluoro - 17α - methyl-5-androstene-3β,17β-diol.*—To a solution of methyl magnesium iodide (prepared from 1.50 g. of magnesium and 3.77 ml. of methyl iodide) in 50 ml. of ether, there is added with stirring under an atmosphere of nitrogen a solution of 500 mg. of 16,16-difluoro-5-androstene-3β-ol-17-one (the compound of Example 1A) in 25 ml. of tetrahydrofuran. 75 ml. more of tetrahydrofuran is added and the mixture distilled until the vapor temperature reaches 60° C. The mixture is then refluxed for one hour, cooled and poured into cold 10% aqueous ammonium sulfate solution. A solid separates which is filtered, washed with water, dried and crystallized from methylene-chloride-hexane to give 16,16-difluoro-17α-methyl-5-androstene-3β,17β-diol, double melting points, 75–80° C. and 135–141° C.

The 3-acetate ester of this compound is prepared by adding at room temperature to 150 mg. of 16,16-difluoro-17α-methyl-5-androstene-3β,17β-diol, 1 ml. of acetic anhydride and 10 ml. of pyridine. The mixture is left overnight at room temperature, then is poured into ice and hydrochloric acid. A precipitate results which is filtered, dried and recrystallized from acetone-hexane to give 16,16-difluoro-17α-methyl-5-androstene-3β,17β-diol 3-acetate, M.P. 161–164° C.

B. *16,16 - difluoro - 17α-methyl-4-androstene-17β-ol-3-one.*—In a manner similar to that described in Example 1B, 240 mg. of 16,16-difluoro-17α-methyl-5-androstene-3β,17β-diol dissolved in 3 ml. of cyclohexanone and 9 ml. of toluene are reacted with 240 mg. of aluminum isopropoxide in 3-ml. of toluene. The resulting product is isolated in the described manner and chromatographed on Florisil. Hexane-ether (4:1) eluates are combined and evaporated in vacuo to a residue which is crystallized from acetone-hexane to give 16,16-difluoro-17α-methyl-4-androstene-17β-ol-3-one, M.P. 157–160° C., [α]$_D$+70°

$\lambda_{max.}^{MeOH}$ 239 mμ (15,500), $\lambda_{max.}^{Nujol}$ 2.9; 6.05; 6.2μ

EXAMPLE 4

*16,16-Difluorotestosterone*

A. *3 - pyrrolidyl - 16,16-difluoro-3,5-androstadiene-17-one.*—To a solution of 430 mg. of 16,16-difluoro-4-androstene-3,17-dione (the compound of Example 1) in 20 ml. of methanol at reflux is added 0.18 ml. of pyrrolidine. The mixture is refluxed for 3 minutes, then cooled. The resulting precipitate is filtered, washed with methanol and dried to give 3-pyrrolidyl-16,16-difluoro-3,5-androstadiene -17-one, M.P. 210–213° C. dec.

$\lambda_{max.}^{MeOH}$ 275 mμ (19,400), $\lambda_{max.}^{Nujol}$ 5.63; 6.1; 6.22μ

B. *16,16-difluorotestosterone.*—345 mg. of the 3-pyrrolidyl-enamine prepared in Example 4A, is dissolved in 10 ml. of tetrahydrofuran and added dropwise over a five minute period to a suspension of 200 mg. of lithium aluminum hydride in 35 ml. of ether. The mixture is refluxed for five minutes, then cooled. One milliliter of water is added cautiously followed by a solution of 1.38 g. of sodium acetate in 1.5 ml. of water. 0.88 ml. of glacial acetic acid and 17.25 ml. of methanol. The mixture is concentrated in vacuo to a residue having a volume of about 30 ml. which is refluxed for five hours, then concentrated in vacuo. Fifty milliliters of aqueous 2 N hydrochloric acid is added to the resultant residue and the mixture extracted twice with ether. The ethereal extracts are combined, washed with 10% sodium bicarbonate solution, then water, dried over sodium sulfate, and evaporated in vacuo to a residue which is crystallized from acetone-hexane to give 16,16-difluoro-testosterone, M.P. 157–159° C., [α]$_D$+93°

$\lambda_{max.}^{MeOH}$ 240 mμ (15,700), $\lambda_{max.}^{Nujol}$ 2.94; 6.02; 6.18μ

EXAMPLE 5

*16,16-Difluoro-17α-Methyl - 4,9(11)-Androstadiene-17β-Ol-3 - One and 16,16 - Difluoro-4,9(11)-Androstadiene-3,17-Dione*

A. *3-ethylenedioxy - 5,9(11)-androstadiene - 17-one.*—One gram of 4,9(11)-androstadiene-3,17-dione in 50 ml. of anhydrous benzene and 0.23 ml. of ethylene glycol is refluxed under a Dean-Stark separator for four hours in the presence of 10 mg. of p-toluenesulfonic acid. The reaction mixture is cooled and made slightly basic by adding dilute aqueous 10% sodium hydroxide. The organic layer is separated and washed to neutrality with water and concentrated in vacuo to a residue which is chromatographed on Florisil. The eluates of hexane and up to 5% ether-in-hexane are combined and concentrated to a residue to give 3-ethylenedioxy-5,9(11)-androstadiene-17-one.

B. *3 - ethylenedioxy - 16 - hydroxymethylene-5,9(11)-androstadiene-17-one.*—A solution of 10 g. of 3-ethylenedioxy-5,9(11)-androstadiene-17-one in 500 ml. of benzene and 100 ml. of tetrahydrofuran is added dropwise to a stirred solution of sodium methoxide (10 g.) in 60 ml. of ethyl formate and 60 ml. of benzene under an atmosphere of nitrogen. The mixture is stirred at room temperature under nitrogen for 18 hours, then is filtered and poured into 300 ml. of water with stirring. The aqueous mixture is neutralized with 6 N hydrochloric acid. A solid separates which is filtered, washed with water and dried to give 3-ethylenedioxy-16-hydroxymethylene-5,9 (11)-androstadiene-17-one, $\lambda_{max.}^{MeOH}$ 265 mμ (9,000)

C. *3-ethylenedioxy - 16,16 - difluoro-5,9(11)-androstadiene-17-one.*—In a manner similar to that described in Example 1A, 5 g. of 3-ethylenedioxy-16-hydroxymethylene-5,9(11)-androstadiene-17-one in 360 ml. of t-butanol containing 14 g. of potassium t-butoxide is reacted with perchloryl fluoride gas. The resultant product is isolated in the described manner and chromatographed on Florisil eluting with ether-hexane mixtures. The eluates are combined and concentrated in vacuo to a residue of 3-ethylenedioxy - 16,16 - difluoro-5,9(11)-androstadiene-17-one, $\lambda_{max.}^{Nujol}$ 5.63μ

D. *3-ethylenedioxy - 16,16 - difluoro - 17α-methyl-5,9 (11)-androstadiene-17β-ol.*—In the manner of Example 3A, 2 g. of 3-ethylenedioxy-16,16-difluoro-5,9(11)-androstadiene-17-one is reacted with methyl magnesium iodide (prepared from 6 g. of magnesium and 15 ml. of methyl iodide) in ether. The resultant product is isolated and purified in the described manner to give 3-ethylenedioxy-16,16-difluoro-17α-methyl - 5,9(11)-androstadiene-17β-ol.

E. *16,16 - difluoro - 17α-methyl-4,9(11)-androstadiene-17β-ol-3-one.*—1.9 grams of 3-ethylenedioxy-16,16-difluoro-17α-methyl-5,9(11)-androstadiene-17β-ol is dissolved in 30 ml. of 90% aqueous acetic acid and the solution is heated on the steam bath for 30 minutes. 100 ml. of water is added and the resulting precipitate is filtered, washed with water, dried and crystallized from acetone-hexane to give 16,16-difluoro-17α-methyl-4,9(11)-androstadiene-17β-ol-3-one.

Similarly, 3 - ethylenedioxy - 16,16 - difluoro - 5,9(11)-androstadiene-17-one is reacted with 90% aqueous acetic acid in the above described manner to give 16,16-difluoro-4,9(11)-androstadiene-3,17-dione.

EXAMPLE 6

16,16-Difluoro-4,9(11)-Androstadiene-17β-Ol-3-One 17-Acetate

A. *3-ethylenedioxy - 16,16 - difluoro-5,9(11)-androstadiene-17β-ol.*—One gram of 3-ethylenedioxy-16,16-difluoro-5,9(11)-androstadiene-17-one (the compound of Example 5C) dissolved in 20 ml. of tetrahydrofuran is added to a solution of 500 mg. of lithium aluminum hydride and 30 ml. of ether. The mixture is refluxed for five minutes, cooled and the excess lithium aluminum hydride is destroyed by the cautious addition of water. One hundred milliliters more of water is added, the solvent layers separated and the aqueous phase is extracted with ether. The ether extracts are combined with the ether reaction solution, dried over sodium sulfate and are evaporated to a residue of 3-ethylenedioxy-16,16-difluoro-5,9(11)-androstadiene-17β-ol.

B. *16,16 - difluoro - 4,9(11) - androstadiene - 17β-ol-3-one.*—500 mg. of 3-ethylenedioxy-16,16-difluoro-5,9(11)-androstadiene-17β-ol is reacted with 15 ml. of 90% aqueous acetic acid in the manner of Example 5E. The resultant product is isolated and purified as described to give 16,16-difluoro-4,9(11)-androstadiene-17β-ol-3-one.

C. *16,16-difluoro - 4,9(11) - androstadiene - 17β-ol-3-one 17-acetate.*—300 mg. of 16,16-difluoro-4,9(11)-androstadiene-17β-ol-3-one is dissolved in 5 ml. of pyridine, then 1 ml. of acetic anhydride is added. The mixture is allowed to stand overnight at room temperature, water is added and the aqueous mixture allowed to stand three hours longer at room temperature. A solid separates which is filtered, washed with water and dried to give 16,16-difluoro - 4,9(11)-androstadiene - 17β-ol-3-one 17-acetate.

Similarly, by substituting other lower alkanoic acid anhydrides such as propionic or caproic for acetic anhydride in the above procedure, there is obtained the corresponding 17-propionate and 17-caproate respectively of 16,16-difluoro-4,9(11)-androstadiene-17β-ol-3-one.

EXAMPLE 7

9α-Bromo-16,16-Difluoro-4-Androstene-11β-Ol-3,17-Dione

To a solution of 500 mg. of 16,16-difluoro-4,9(11)-androstadiene-3,17-dione (prepared as described in Example 5) dissolved in 10 ml. of dioxane and 0.75 ml. of 0.5 N perchloric acid is added with stirring over a 16-minute period 235 mg. of N-bromoacetamide. The reaction mixture is stirred at room temperature for one hour then 10% aqueous sodium sulfite is added until the mixture gives a negative starch-iodide test. Ice and water are added to the reaction mixture. A solid separates which is filtered, washed with water and dried to give substantially 9α-bromo - 16,16 - difluoro - 4-androstene-11β-ol-3,17-dione.

Similarly, 16,16-difluoro-17α-methyl-4,9(11)-androstadiene-17β-ol-3-one (the compound of Example 5) and 16,16-difluoro - 4,9(11)-androstadiene - 17β-ol-3 - one 17-acetate (the compound of Example 6) is reacted with perchloric acid and N-bromoacetamide to give respectively 9α-bromo-16,16-difluoro-17α-methyl-4-androstene-11β,17β-diol-3-one and 9α-bromo-16,16-difluoro-4-androstene-11β,17β-diol-3-one 17 acetate.

EXAMPLE 8

9α,16,16-Trifluoro-4-Androstene-11β-Ol-3,17-Dione

A. *9β,11β-epoxy-16,16-difluoro-4-androstene - 3,17 - dione.*—460 mg. of 9α-bromo-16,16-difluoro-4-androstene-11β-ol-3,17-dione (the compound of Example 7) and 300 mg. of anhydrous potassium acetate in 5 ml. of anhydrous ethanol are refluxed for one hour. The reaction mixture is cooled and water added. The resulting precipitate is filtered, washed with water and dried to give 9β,11β-epoxy-16,16-difluoro-4-androstene-3,17-dione.

B. *9α,16,16-trifluoro-4-androstene-11β-ol-3,17-dione.*—300 mg. of hydrogen fluoride in 5 ml. of chloroform is added at 0° C. to a stirred solution of 250 mg. of 9β,11β-epoxy-16,16-difluoro-4-androstene-3,17-dione in 5 ml. of chloroform. The reaction mixture is stirred at 0° C. for 1½ hours and then 10% aqueous sodium bicarbonate solution is added until the mixture is made neutral. The mixture is extracted with chloroform. The chloroform extracts are combined, washed with 10% sodium bicarbonate solution and water and evaporated in vacuo to a residue which is crystallized from acetone-hexane to give 9α,16,16-trifluoro-4-androstene-11β-ol-3,17-dione.

9α-bromo-16,16-difluoro-17α-methyl-4-androstene-11β,17β-diol-3-one and 9α-bromo-16,16-difluoro-4-androstene-11β,17β-diol-3-one 17-acetate are each reacted according to the above described procedures A and B to obtain the intermediary 9β,11β-epoxides, i.e. 9β,11β-epoxy-16,16-difluoro-17α-methyl-4-androstene-17β-ol-3-one and 9β,11β-epoxy-16,16-difluoro-4-androstene-17β-ol-3-one 17-acetate which, in turn, are reacted with hydrogen fluoride to give respectively, 9α,16,16-trifluoro-17α-methyl-4-androstene-11β,17β-diol-3-one and 9α,16,16-trifluoro-4-androstene-11β,17β-diol-3-one 17-acetate.

Similarly, by substituting hydrogen chloride gas or 55% hydroiodic acid for hydrogen fluoride in procedures analogous to that described above, the 9β,11β-epoxy-16,16-difluoro intermediates are converted to the corresponding 9α-chloro-11β-hydroxy and 9α-iodo-11β-hydroxy-4-androstenes.

EXAMPLE 9

9α,16,16-Trifluoro-17α-Ethinyl-4-Androstene-11β,17β-Diol-3-One

9α,16,16-trifluoro-4-androstene-11β-ol-3,17-dione is reacted with ethylene glycol in the manner of Example 5A to give 3-ethylenedioxy-9α,16,16-trifluoro-5-androstene-11β-ol-3,17-dione.

In the manner of Example 2A, 3-ethylenedioxy-9α,16,16-trifluoro-5-androstene-11β-ol-3,17-dione in dimethylsulfoxide is reacted with sodium acetylide to give 3-ethylenedioxy-9α,16,16-trifluoro-17α-ethinyl-5-androstene - 11β, 17β-diol-3-one. Hydrolysis of the 3-ethylene ketal group is effected by means of aqueous acetic acid in the manner of Example 5D to give 9α,16,16-trifluoro-17α-ethinyl-4-androstene-11β,17β-diol-3-one.

Similarly, 9α-bromo-16,16-difluoro-4 - androstene - 11β-ol-3,17-dione (the compound of Example 7) is reacted according to the above procedure to give 9α-bromo-16,16-difluoro-17α-ethinyl-4-androstene-11β,17β-diol-3-one.

EXAMPLE 10

16,16-Difluoro-17α-Methyl-4-Androstene-11β,17β-Diol-3-One

One hundred milligrams of 9α-bromo-16,16-difluoro-17α-methyl-4-androstene-11β,17β-diol-3-one (prepared as described in Example 7) in 35 ml. of 15% aqueous ethanol is stirred at room temperature and there is added 100 mg. of zinc dust. The reaction mixture is stirred 18 hours at room temperature, then filtered and the filtrate concentrated in vacuo. Water is added to the resultant residue and the mixture extracted with methylene chloride. The methylene chloride extracts are combined and evaporated to a residue which is chromatographed on Florisil. The hexane-ether eluates which range in concentration from 60% ether-in-hexane to 100% ether are combined and concentrated in vacuo to a residue which is crystallized from acetone-hexane to give 16,16-difluoro-17α-methyl-4-androstene-11β,17β-diol-3-one.

EXAMPLE 11

9α-Bromo-16,16-Difluoro-4-Androstene-11β,17β-Diol-3-One

One gram of 9α-bromo-16,16-difluoro-4-androstene-11β,17β-diol-3-one 17-acetate (prepared as described in Example 7) is dissolved in 60 ml. of 0.27 N perchloric acid in methanol. The solution is stirred at room temperature for 17 hours, then water is added. The resultant precipitate is filtered off, washed with water, dried and crystallized from acetone-hexane to give 9α-bromo-16,16-difluoro-4-androstene-11β,17β-diol-3-one.

Similarly, 9α,16,16-trifluoro-4-androstene-11β,17β-diol-3-one 17-acetate and 9α-chloro-16,16-difluoro-4-androstene-11β,17β-diol-3-one 17-acetate (both prepared as described in Example 8) are each reacted with methanolic perchloric acid according to the procedure of this example to give respectively 9α,16,16-trifluoro-4-androstene-11β,17β-diol-3-one and 9α-chloro-16,16-difluoro-4-androstene-11β,17β-diol-3-one.

EXAMPLE 12

*Preparation of 11-Keto Derivatives From the 11-Hydroxyandrostenes*

To a solution of 0.3 g. of 9α-bromo-16,16-difluoro-4-androstene-11β-ol-3,17-dione (the compound of Example 7) in 15 ml. of acetic acid is added dropwise a solution of 60 mg. of chromium trioxide in 1 ml. of water and 3 ml. of acetic acid. The resulting mixture is allowed to stand for 5 hours, then diluted with water and extracted with methylene chloride. The organic extracts are washed with water, dried over magnesium sulfate, filtered and evaporated to a residue which is crystallized from acetone-hexane to give 9α-bromo-16,16-difluoro-4-androstene-3,11,17-trione.

In a similar manner,

9α,16,16-trifluoro-4-androstene-11β-ol-3,17-dione,
9α,16,16-trifluoro-17α-ethinyl-4-androstene-11β,17β-diol-3-one,
9α-bromo-16,16-difluoro-17α-methyl-4-androstene-11β,17β-diol-3-one,
9α,16,16-trifluoro-17α-methyl-4-androstene-11β,17β-diol-3-one,
9α-bromo-16,16-difluoro-4-androstene-11β,17β-diol-3-one 17-acetate,
9α,16,16-trifluoro-4-androstene-11β,17β-diol-3-one 17-acetate,
9α-chloro-16,16-difluoro-4-androstene-11β,17β-diol-3-one 17-acetate,
9α-iodo-16,16-difluoro-17α-methyl-4-androstene-11β,17β-diol-3-one, and
16,16-difluoro-17α-methyl-4-androstene-11β,17β-diol-3-one are each oxidized with aqueous chromium trioxide and acetic acid to give respectively, 9α,16,16-trifluoro-4-androstene-3,11,17-trione,
9α,16,16-trifluoro-17α-ethinyl-4-androstene-17β-ol-3,11-dione,
9α-bromo-16,16-difluoro-17α-methyl-4-androstene-17β-ol-3,11-dione,
9α,16,16-trifluoro-17α-methyl-4-androstene-17β-ol-3,11-dione,
9α-bromo-16,16-difluoro-4-androstene-17β-ol-3,11-dione 17-acetate,
9α,16,16-trifluoro-4-androstene-17β-ol-3,11-dione 17-acetate,
9α-chloro-16,16-difluoro-4-androstene-17β-ol-3,11-dione 17-acetate,
9α-iodo-16,16-difluoro-17α-methyl-4-androstene-17β-ol-3,11-dione, and
16,16-difluoro-17α-methyl-4-androstene-17β-ol-3,11-dione.

EXAMPLE 13

*9α-Bromo-16,16-Difluoro-4-Androstene-17β-Ol-3,11-Dione*

To one gram of 9α-bromo-16,16-difluoro-4-androstene-17β-ol-3,11-dione 17-acetate (prepared as described in Example 12) is added 60 ml. of 0.27 N perchloric acid in methanol. The reaction solution is stirred overnight at room temperature then poured into water. A solid results which is filtered, washed with water, dried and recrystallized from acetone-hexane to give 9α-bromo-16,16-difluoro-4-androstene-17β-ol-3,11-dione.

In a similar manner, 9α, 16,16-trifluoro-4-androstene-17β-ol-3,11-dione 17-acetate and 9α-chloro-16,16-difluoro-4-androstene-17β-ol-3,11-dione 17-acetate are hydrolyzed with methanolic perchloric acid to give respectively 9α,16,16-trifluoro-4-androstene-17β-ol-3,11-dione and 9α-chloro-16,16-difluoro-4-androstene-17β-ol-3,11-dione.

EXAMPLE 14

*16,16-Difluoro-19-Nortestosterone*

A. *3-methoxy-16-hydroxymethylene-1,3,5(10)-estratriene-17-one.*—To a stirred solution of 25 g. of 3-methoxy-1,3,5(10)-estratriene-17-one in 600 ml. of tetrahydrofuran containing 25 g. of sodium methoxide under an atmosphere of nitrogen is added 200 ml. of ethyl formate over a period of 30 minutes. The reaction mixture is stirred under nitrogen at room temperature for 18 hours and then is poured into water. The resulting solution is acidified with 6 N aqueous hydrochloric acid. A solid separates which is filtered and dried in vacuo to give substantially 3-methoxy - 16 - hydroxymethylene-1,3,5(10)-estratriene-17-one.

$\lambda_{max}^{MeOH}$ 268 mμ (ε 10,300)

which is used without further purification in the subsequent reaction.

B. *3-methoxy-16,16-difluoro-1,3,5(10)-estratriene-17-one.*—To a solution of 4.2 g. of 3-methoxy-16-hydroxymethylene-1,3,5(10)-estratriene-17-one in 450 ml. of t-butanol is added 85 ml. of a molar solution of potassium t-butoxide in t-butanol. Perchloryl fluoride gas is bubbled through the stirred solution under an atmosphere of nitrogen at room temperature for 90 minutes. The reaction mixture is then diluted with 2 l. of water and extracted with methylene chloride. The organic extracts are combined, washed with water, dried and evaporated in vacuo to a residue which is chromatographed on Florisil. The Florisil is eluted with hexane-ether mixtures. The eluates ranging in concentration from 7:3 hexane-ether to 1:1 hexane-ether are combined and concentrated to a residue which is crystallized from ether-hexane to give 3-methoxy-16,16-difluoro-1,3,5(10)- estratriene-17-one, M.P. 126–128° C. [α]_D +167°, $\lambda_{max}^{Nujol}$ 5.63μ

C. *3-methoxy-16,16-difluoro-1,3,5(10)-estratriene-17β-ol.*—To a solution of 170 mg. of 3-methoxy-16,16-difluoro-1,3,5(10)-estratriene-17-one in 14 ml. of isopropanol is added 300 mg. of sodium borohydride. The solution is refluxed for one hour, then cooled and diluted with water. A solid separates which is filtered, washed with water, dried and crystallized from aqueous methanol to give 3-methoxy-16,16-difluoro-1,3,5(10)-estratriene-17β-ol, M.P. 123–127° C., [α]_D +71°.

D. *3-methoxy-16,16-difluoro-2,5(10)-estradiene-17β-ol.*—To a stirred solution of 460 mg. of 3-methoxy-16,16-difluoro-1,3,5(10)-estratriene-17β-ol in 40 ml. of ether is added 50 ml. of liquid ammonia followed by 470 mg. of lithium. Stirring is continued with cooling in a Dry Ice-acetone bath for 10 minutes, then 5.5 ml. of anhydrous ethanol is added dropwise over a period of 20 minutes. The ammonia is allowed to evaporate after which water is added cautiously and the resulting mixture is extracted with ether. The ethereal extracts are combined, washed with water, dried over sodium sulfate, filtered and evaporated to a residue substantially of 3-methoxy-16,16-difluoro-2,5(10)-estradiene-17β-ol, which is used without further purification in the subsequent procedure.

E. *16,16-difluoro-19-nortestosterone.*—420 mg. of 3-methoxy-16,16-difluoro-2,5(10)-estradiene-17β-ol (prepared as described in Example 14D) is dissolved in 20 ml. of methanol and 12 ml. of 3 N hydrochloric acid. The solution is heated at 60° C. for 15 minutes then is cooled and water added. The aqueous mixture is extracted with ether. The ethereal extracts are combined, washed with 10% sodium bicarbonate solution, then with water, dried over sodium sulfate, filtered and evaporated to a residue which is crystallized from acetone-hexane to give 16,16-difluoro-19-nortestosterone, $$\lambda_{max}^{MeOH}\ 240\ m\mu$$

Alternatively, the compound of this example is prepared in the following manner.

To a solution of 250 mg. of 3-methoxy-16,16-difluoro-2,5(10)-estradiene-17β-ol (the compound of Example 14D) in 20 ml. of methanol is added 330 mg. of oxalic acid in 4.3 ml. of water. The reaction mixture is left at room temperature for 40 minutes, then water is added. A solid separates which is filtered, dried and recrystallized from acetone-hexane to give 16,16-difluoro-19-nor-5(10)-estrene-17β-ol-3-one. The 16,16-difluoro-5-estrene-17β-ol-3-one is then reacted with hydrochloric acid in methanol in the manner described above to give 16,16-difluoro-19-nortestosterone.

16,16-difluoro-19-nortestosterone is reacted with chromium trioxide in aqueous acetic acid in a manner similar to that described in Example 12 to give 16,16-difluoro-19-nor-4-androstene-3,17-dione.

EXAMPLE 15

*16,16 - difluoro-17α - Methyl - 19 - Nor - 4 - Androstene-17β - Ol - 3 - One and 16,16 - Difluoro - 17α.- Ethinyl-19-Nor-4-Androstene-17β-Ol-3-One*

A. *The 3-ethylene ketal of 16,16-difluoro-19-nor-4-androstene-3,17-dione.*—In a manner similar to that described in Example 5A, 16,16-difluoro-19-nor-4-androstene-3,17-dione (prepared as described in Example 14) is reacted with ethylene glycol in the presence of p-toluenesulfonic acid The resulting product is isolated and purified in the described manner to give the 3-ethylene ketal of 16,16-difluoro-19-nor-4-androstene-3,17-dione.

B. *The 3-ethylene ketal of 16,16-difluoro-17α-methyl-19-nor-4-androstene-17β-ol-one and the 3-ethylene ketal of 16,16-difluoro-17α-ethinyl-19-nor-4-androstene-17β-ol-3-one.*—In a manner similar to that described in Example 3A, the 3-ethylene ketal of 16,16-difluoro-19-nor-4-androstene-3,17-dione is reacted with methyl magnesium iodide to give the 3-ethylene ketal of 16,16-difluoro-17α-methyl-19-nor-4-androstene-17β-ol-3-one.

When the 3-ethylene ketal of 16,16-difluoro-19-nor-4-androstene-3,17-dione is reacted with sodium acetylide according to the procedure of Example 2A there is obtained the 3-ethylene ketal of 16,16-difluoro-17α-ethinyl-19-nor-4-androstene-17β-ol-3-one.

C. *16,16 - difluoro - 17α - methyl - 19 - nor - 4 - androstene - 17β - ol - 3 - one and 16,16 - difluoro - 17α - ethinyl-19 - nor - 4 - androstene - 17β - ol - 3 - one.*—In a manner similar to that described in Example 5E, the 3-ethylene ketal of 16,16-difluoro-17α-methyl-19-nor-4-androstene-17β-ol-3-one and of 16,16-difluoro-17α-ethinyl-19-nor-4-androstene-17β-ol-3-one are each reacted with aqueous acetic acid to give respectively 16,16-difluoro-17α-methyl-19-nor-4-androstene-17β-ol-3-one and 16,16-difluoro-17α-ethinyl-19-nor-4-androstene-17β-ol-3-one.

EXAMPLE 16

*9α-Halogeno-16,16-Difluoro-11β-Hydroxy-19-Nor-4,9(11)-Androstadiene-3,17-Dione*

A. *11α - hydroxy - 16,16 - difluoro - 19 - nor - 4 - androstene - 3,17 - dione.*—A culture of *Rhizopus nigricans* (A.T.C.C. 6277b) is maintained on 1% yeast extract, 1% cerelose agar at 28° C. Ten 300 ml. Erlenmeyer flasks each containing 100 ml. aliquots of the following sterile medium:

20 g. cerelose, 5 g. proteose peptone No. 3, 5 g. soybean meal, 5 g. sodium chloride, 5 g. monopotassium diacid phosphate and 3 g. yeast extract in sufficient water to provide a liter of solution and adjusted to pH 6.8, are inoculated with a spore suspension of *Rhizopus nigricans* from the agar slants and incubated on a shaker at 280 r.p.m. at 28° C. From 24 to 48 hours after inoculation, 25 mg. of 16,16-difluoro-19-nor-4-androstene-3,17-dione (prepared as described in Example 14) in 100 ml. of methanol are added to each flask, and shaken at about 28° C. for a period of one to two days. The flasks are removed from the shaker when the conversion to the 11α-hydroxy steroid is completed, as indicated by a paper chromatography technique which is that outlined by Bush, Journal of Biochemistry 50, 370 (1952) and modified by Shull, "Paper Chromatography of Steroid Fermentation Products," 126th Meeting of the American Chemical Society, September 12–17, 1954, New York, New York, Section 9A, paper No. 24. The contents of the flasks are combined and extracted with methylene chloride. The extracts are dried over sodium sulfate, filtered, and evaporated to a residue which is crystallized from acetone-hexane to give 11α-hydroxy-16,16-difluoro-19-nor-4-androstene-3,17-dione.

B. *11α - hydroxy - 16,16 - difluoro - 19 - nor - 4 - androstene - 3,17 - dione 11 - p - toluenesulfonate.*—A solution of 5 g. of 11α-hydroxy-16,16-difluoro-19-nor-4-androstene-3,17-dione in 20 ml. of chloroform and 25 ml. of dry pyridine is chilled in an ice bath and 6 g. of p-toluenesulfonyl chloride is added in small portions. The reaction mixture is stirred in the cold for 90 minutes, then allowed to warm to and remain at room temperature for 20 hours. The mixture is then poured into ice-water, thoroughly and extracted with chloroform. The organic solution is washed with water, dried over magnesium sulfate, filtered and concentrated in vacuo to a residue which is triturated with a small quantity of ethanol and filtered to give 11α-hydroxy-16,16-difluoro-19-nor-4-androstene-3,17-dione 11-p-toluenesulfonate. This compound is used without further purification in the procedure immediately following.

C. *16,16 - difluoro - 19 - nor - 4,9(11) - androstadiene-3,17 - dione.*—To 2 g. of 11α-hydroxy-16,16-difluoro-19-nor-4-androstene-3,17-dione 11-p-toluenesulfonate in 20 ml. of dimethylformamide is added 3 g. of lithium acetate in 2 ml. of water. The resultant mixture is heated at 110° C. for 6 hours, then water is added. A solid separates which is filtered, dried and crystallized from acetone-hexane to give 16,16-difluoro-19-nor-4,9(11)-androstadiene-3,17-dione.

D. *9α - halogeno - 16,16 - difluoro - 11β - hydroxy - 19 - nor - 4 - androstene - 3,17 - dione.*—16,16-difluoro-19-nor-4,9(11)-androstadiene-3,17-dione is reacted with N-bromoacetamide in the presence of 0.5 N perchloric acid in the manner described in Example 7 to give 9α-bromo-16,16 - difluoro - 11β - hydroxy - 19 - nor - 4 - androstene-3,17-dione.

In a manner similar to that described in Example 8, 9α-bromo - 16,16 - difluoro - 11β - hydroxy - 19 - nor - 4-androstene-3,17-dione is reacted with potassium acetate in anhydrous ethanol to give 9β,11β-epoxy-16,16-difluoro-19-nor-4-androstene-3,17-dione which, in turn, is reacted with hydrogen fluoride in chloroform to give 9α,16,16-trifluoro-11β-hydroxy-19-nor-4-androstene-3,17-dione.

Similarly, by substituting hydrogen chloride gas for hydrogen fluoride in the procedure described above, the 9β,11β - epoxy - 16,16 - difluoro - 19 - nor - 4 - androstene-3,17-dione is converted to 9α-chloro-16,16-difluoro-11β-hydroxy-19-nor-4-androstene-3,17-dione.

EXAMPLE 17

*Preparation of the 1-Dehydro Analogs of the 4-Androstenes of Examples 1–16*

A. 16,16 - difluoro - 4 -androstene - 3,17 - dione (the compound of Example 1) is subjected to the action of *Corynebacterium simplex* in the following manner.

A solution of 1 g. of yeast extract (Difco) in one liter of tap water, the pH of which is adjusted to 6.9, is distributed among ten 300 ml. Erlenmeyer flasks and to each flask is added a loopful, 2 ml., of *Corynebacterium simplex* (A.T.C.C. 6946). The resulting suspensions are incubated at 30° C. on a shaking machine for 18 hours. One-half gram of 16,16-difluoro-4-androstene-3,17-dione is dissolved in 25 ml. of acetone and the resulting solution is distributed equally among the ten flasks containing the 18-hour growth of *Corynebacterium simplex*. The culture containing the 16,16-difluoro-4-androstene-3,17-dione is then incubated at 30° C. for 24 hours. At the end of 24 hours, the contents of the flasks are combined and extracted with a total of 3 liters of chloroform. The crude chloroform extract from the transformation is then concentrated to a residue which is crystallized from methylene chloride-hexane, and recrystallized from the same solvent mixture to afford 16,16-difluoro-1,4-estradiene-3,17-dione.

B. Alternatively, 16,16-difluoro-1,4-androstadiene-3,17-dione is prepared in the following manner.

300 mg. of 16,16-difluoro-4-androstene-3,17-dione and 90 mg. of selenium dioxide in 15 ml. of t-butanol to which has been added 0.15 ml. of glacial acetic acid is refluxed under nitrogen for 24 hours. An additional 90 mg. of selenium dioxide is then added and the mixture refluxed for 24 hours longer. The reaction mixture is cooled and filtered. The filtrate is diluted with water, then extracted with methylene chloride. The methylene chloride extracts are combined, washed with dilute aqueous sodium bicarbonate, then water. The washed solution is concentrated in vacuo to a residue which is crystallized from acetone-hexane to give 16,16-difluoro-1,4-androstadiene-3,17-dione.

Similarly, by using either procedures A or B described above, the 4-androstene compounds prepared in Examples 2–17 are converted to their respective 1-dehydro analogs.

EXAMPLE 18

Preparation of 17-Esters

A solution of 1 g. of 16,16-difluoro-17α-ethinyl-4-androstene-17β-ol-3-one (the compound of Example 2) in 10 ml. of pyridine and 10 ml. of acetic anhydride is refluxed under an atmosphere of nitrogen until esterification is substantially complete as determined by paper chromatography using dinitrophenylhydrazine as the indicating reagent. The reaction mixture is cooled, poured into water and the aqueous mixture stirred for about 3 hours, then extracted with ether. The ethereal extracts are combined and washed with 5% aqueous sodium bicarbonate solution and with water. The washed solution is dried over magnesium sulfate, filtered and evaporated in vacuo to a residue which is crystallized from acetone-hexane to give 16,16-difluoro-17α-ethinyl-4-androstene-17β-ol-3-one 17-acetate.

By utilizing techniques similar to the above-described procedure, the 17β-hydroxy-4-androstenes prepared in Examples 1–17 are converted to their corresponding 17-acetate esters.

Similarly, by substituting other acid anhydrides such as propionic, caproic or caprylic for acetic anhydride in the above procedure there are obtained the corresponding 17-propionate, 17-caproate and 17-caprylate of the aforementioned compounds.

EXAMPLE 19

9α-Bromo-11β,16α,16β,Trifluoro-4-Androstene-3,17-Dione

To a stirred solution of 1 g. of 16,16-difluoro-4,9(11)-androstadiene-3,17-dione (prepared as described in Example 5) in 50 ml. of diethylacetic acid in a polyethylene bottle there is added a solution of 1.35 g. of hydrogen fluoride in 5 ml. of a chloroform-tetrahydrofuran mixture (3:1) followed by 530 mg. of N-bromoacetamide. The reaction mixture is stirred at room temperature for 17 hours then is poured into 500 ml. of 10% aqueous sodium carbonate solution and extracted with methylene chloride. The methylene chloride extracts are combined, washed with water, dried over magnesium sulfate, filtered and evaporated in vacuo to a residue which is crystallized from acetone-hexane to give 9α-bromo-11β,16α,16β-trifluoro-4-androstene-3,17-dione.

In a similar manner 16,16-difluoro-4,9(11)-androstadiene-17β-ol-3-one (the compound of Example 6B), 16,16-difluoro-4,9(11)-androstadiene-17β-ol-3-one 17-acetate (the compound of Example 6C), 16,16-difluoro-1,4,9(11)-androstatriene-3,17-dione (prepared as described in Example 17), 16,16-difluoro-17α-methyl-4,9(11)-androstadiene-17β-ol-3-one (the compound of Example 5E) and 16,16-difluoro-19-nor-4,9(11)-androstadiene-3,17-dione (the compound of Example 16C) are each reacted with hydrogen fluoride and N-bromoacetamide to give respectively, 9α-bromo11β,16,16-trifluoro-4-androstene-17β-ol-3-one, 9α-bromo-11β,16,16-trifluoro-4-androstene-17β-ol-3-one 17-acetone, 9α-bromo-11β,16,16-trifluoro-1,4-androstadiene-3,17-dione, 9α-bromo-11β,16,16-trifluoro-17α-methyl-4-androstene-17β-ol-3-one and 9α-bromo-11β,16,16-trifluoro-19-nor-4-androstene-3,17-dione.

EXAMPLE 20

9α-11β-Dichloro-16α,16β-Difluoro-17α-Methyl-4-Androstene-17β-Ol-3-One

To a stirred solution of 0.8 g. of 16,16-difluoro-17α-methyl-4,9(11)-androstadiene-17β-ol-3-one. (the compound of Example 5E) in 30 ml. of methylene chloride and 16 ml. of pyridine is added a solution of 280 mg. of chlorine in 10 ml. of carbon tetrachloride. The reaction mixture is stirred for one hour at room temperature, then is diluted with 100 ml. of methylene chloride and washed successively with 10% aqueous sulfuric acid, N-sodium thiosulfate and water. The solution is dried over magnesium sulfate, filtered and evaporated in vacuo to a residue which is crystallized from acetone-hexane to give 9α,11β-dichloro-16α,16β-difluoro-17α-methyl - 4 - androstene-17β-ol-3-one.

In a similar manner, 16,16-difluoro-19-nor-4,9(11)-androstadiene-3,17-dione is reacted with chlorine in carbon tetrachloride to give 9α,11β-dichloro-16,16-difluoro-19-nor-4-androstene-3,17-dione.

EXAMPLE 21

9α-Chloro-11β,16α-Trifluoro4-Androstene-17β-Ol-3-One

To a stirred solution of 1 g. of 16,16-difluoro-4,9(11)-androstadiene-17β-ol-3-one (the compound of Example 6B) and 900 mg. of N-chlorosuccinimide in 30 ml. of carbon tetrachloride and 4 ml. of pyridine is added 580 mg. of hydrogen fluoride in 1.5 ml. of chloroform-tetrahydrofuran (3:1). The reaction mixture is stirred at room temperature for 20 hours, then is poured into 300 ml. of 10% aqueous sodium carbonate solution and extracted with methylene chloride. The methylene chloride extracts are washed with 5% aqueous sulfuric acid and water, then dried over magnesium sulfate, filtered and evaporated to a residue which is crystallized from acetone-hexane to give 9α-chloro-11β,16α,16β-trifluoro-4-androstene-17β-ol-3-one.

In a similar manner, 16,16-difluoro-17α-methyl-4,9 (11)-androstadiene-17β-ol-3-one (the compound of Example 5E) and 16,16-difluoro-19-nor-4,9(11)-androstadiene-3,17-dione (the compound of Example 16C) are each reacted with N-chlorosuccinimide and hydrogen fluoride to give respectively, 9α-chloro-11β,16,16-trifluoro- 17α-methyl-4-androstene-17β-ol-3-one and 9α-chloro-11β, 16,16-trifluoro-19-nor-4-androstene-3,17-dione.

EXAMPLE 22

*9α,11β,16α,16β-Tetrafluoro-4-Androstene-3,17-Dione*

To a solution of 1 g. of 16,16-difluoro-4,9(11)-androstadiene-3,17-dione (prepared as in Example 5) in 40 ml. of chloroform, chilled to −30° C. in a Dry Ice-acetone bath, is added with stirring 625 mg. of lead tetrafluoride. The mixture is stirred in the cold for 18 hours, then filtered. The filtrate is evaporated to a residue which is chromatographed on magnesium silicate. The material eluted with 60% ether-in-hexane to 100% ether is combined and crystallized from acetone hexane to give 9α,11β,16α,16β-tetrafluoro-4-androstene-3,17-dione.

In a similar manner, 16,16-difluoro-17α-methyl-4,9(11)-androstadiene-17β-ol-3-one (the compound of Example 5E) and 16,16-difluoro-4,9-(11)-androstadiene-17β-ol-3-one 17-acetate (the compound of Example 6) are reacted with lead tetrafluoride according to the above procedure to give respectively 9α,11β,16α,16β-tetrafluoro-17α-methyl-4-androstene-17β-ol-3-one and 9α,11β,16α,16β-tetrafluoro-4-androstene-17β-ol-3-one 17-acetate.

EXAMPLE 23

*Alternate Procedure for the Preparation of 16,16-Difluoro-5-Androstene-3β-Ol-17-One (the Compound of Example 1A)*

A. 16 - (1′-hydroxy-1′-carbethoxy)methylene-5-androstene-3β-ol-17-one. (16-ethoxalyl-5-androstene-3β-ol-17-one.).—To a stirred solution of 10 g. of sodium methoxide in 60 ml. of ethyl oxalate and 60 ml. of benzene under an atmosphere of nitrogen, there is added dropwise a solution containing 10 g. of 5-androstene-3β-ol-17-one in 500 ml. of benzene and 100 ml. of tetrahydrofuran. The mixture is stirred under nitrogen at room temperature for 18 hours. The reaction mixture is then filtered, poured into 300 ml. of water with stirring and neutralized with 6 N hydrochloric acid. A solid separates which is filtered, washed with water and dried to give 16-(1′-hydroxy-1′-carbethoxy)methylene - 5 - androstene-3β-ol-17-one (16 - ethoxalyl-5-androstene-3β-ol-17-one) which is used without further purification in the following procedure.

B. *16,16 - difluoro-5-androstene-3β-ol-17-one.*—16-(1′-hydroxy-1′-carbethoxy)methylene - 5 - androstene-3β-ol-17 - one (16 - ethoxalyl - 5 - androstene - 3β - ol - 17-one) is reacted with perchloroyl fluoride in t-butanol in the presence of potassium t-butoxide in the manner of Example 1A. The resultant product is isolated and purified as described to give 16,16-difluoro-5-androstene-3β-ol-17-one.

In a similar manner, 3-ethylenedioxy-5,9(11)-androstadiene-17-one (the compound of Example 5A) is reacted with ethyl oxalate and sodium methoxide to give 3-ethylenedioxy-16-(1′-hydroxy - 1′ - carbethoxy)methylene-5,9(11)-androstadiene-17-one (3 - ethylenedioxy-16-ethoxalyl-5,9(11)-androstadiene-17-one) which when reacted with perchloryl fluoride according to the procedure of Example 1A yields 3-ethylenedioxy-16,16-difluoro-5,9(11)-androstadiene-17-one.

I claim:
1. A compound selected from the group consisting of 16,16-difluoroandrostenes having the following formula:

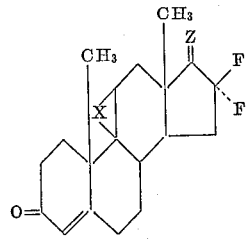

and the 19-nor analogs thereof; wherein X is a member of the group consisting of O and an unsaturation between C–9 and C–11 and Z is a member of the group consisting of O, (H,βOR) and (αCH₃βOR) wherein R is a member of the group consisting of H and acetyl.

2. A compound selected from the group consisting of 16,16-difluoro-5-androstenes of the following formulae:

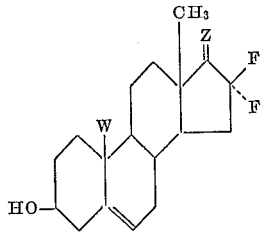

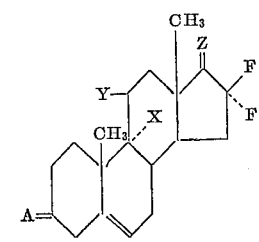

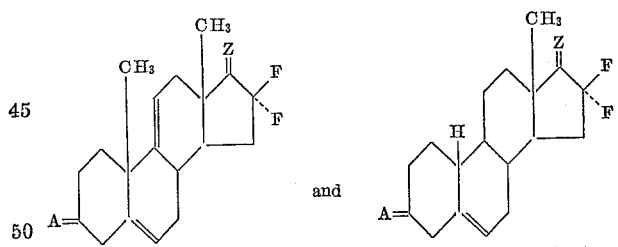

and wherein W is a member of the group consisting of hydrogen and methyl; Z is a member selected from the group consisting of O,(H,βOH), (α-lower alkyl,βOH) and (α-lower alkynyl,βOH); X and Y are halogens; and A is ethylenedioxy.

3. 16-(1′-hydroxy - 1′ - carbethoxy)methylene-5-androstene-3β-ol-17-one.

4. 3-ethylenedioxy - 16 - (1′ - hydroxy-1′-carbethoxy)methylene-5,9(11)-androstadiene-17-one.

5. 16α,16β-difluoro-3β-hydroxy androst-5-en-17-one.

No references cited.